United States Patent
Kotra et al.

(10) Patent No.: US 12,099,723 B2
(45) Date of Patent: Sep. 24, 2024

(54) TAG AND DATA CONFIGURATION FOR FINE-GRAINED CACHE MEMORY

(71) Applicant: Advanced Micro Devices, Inc., Santa Clara, CA (US)

(72) Inventors: Jagadish B. Kotra, Austin, TX (US); Marko Scrbak, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 71 days.

(21) Appl. No.: 17/956,614

(22) Filed: Sep. 29, 2022

(65) Prior Publication Data

US 2024/0111425 A1    Apr. 4, 2024

(51) Int. Cl.
     *G06F 3/06*    (2006.01)

(52) U.S. Cl.
     CPC .......... *G06F 3/0613* (2013.01); *G06F 3/0659* (2013.01); *G06F 3/0679* (2013.01)

(58) Field of Classification Search
     CPC ..... G06F 3/0613; G06F 3/0659; G06F 3/0679
     See application file for complete search history.

(56) References Cited

U.S. PATENT DOCUMENTS

| | | |
|---|---|---|
| 2016/0124644 A1 | 5/2016 | Riga et al. |
| 2018/0203802 A1* | 7/2018 | Alves ................ G06F 12/0862 |
| 2019/0384718 A1 | 12/2019 | Hansson et al. |
| 2021/0294743 A1 | 9/2021 | Randall et al. |
| 2021/0365376 A1 | 11/2021 | Roberts et al. |
| 2022/0058132 A1 | 2/2022 | Roberts et al. |
| 2022/0398198 A1* | 12/2022 | Miller ................ G06F 3/0658 |
| 2024/0004786 A1 | 1/2024 | Adhinarayanan et al. |

OTHER PUBLICATIONS

O'Connor, M., et al., "Fine-Graned DRAM: Energy-Efficient DRAM for Extreme Bandwidth Systems", MICRO-50, Oct. 2017, 14 pgs.
Loh, G. H., & Hill, M. D., "Efficiently Enabling Conventional Block Sizes for Very Large Die-Stacked DRAM Caches", MICRO '11, ACM, Dec. 2011, 11 pgs.
Qureshi, M. K., & Loh, G. H., "Fundamental Latency Trade-offs in Architecting DRAM Caches", 2012 IEEE/ACM 45th Annual International Symposium on Microarchitecture, IEEE, 2012, 12 pgs.
Young, V., et. al., ACCORD: Enabling Associativity for Gigascale DRAM Caches by Coordinating Way-Install and Way-Prediction, 2018 ACM/IEEE 45th Annual International Symposium on Computer Architecture, Jun. 2018, 12 pgs.

* cited by examiner

*Primary Examiner* — Edward J Dudek, Jr.
(74) *Attorney, Agent, or Firm* — Volpe Koenig (57) ABSTRACT

A method for operating a memory having a plurality of banks accessible in parallel, each bank including a plurality of grains accessible in parallel is provided. The method includes: based on a memory access request that specifies a memory address, identifying a set that stores data for the memory access request, wherein the set is spread across multiple grains of the plurality of grains; and performing operations to satisfy the memory access request, using entries of the set stored across the multiple grains of the plurality of grains.

20 Claims, 6 Drawing Sheets

TAG AND DATA CONFIGURATION FOR FINE-GRAINED CACHE MEMORY

BACKGROUND

Caches improve performance by storing copies of data considered likely to be accessed again in the future into a low latency cache memory. Improvements to cache technologies are constantly being made.

BRIEF DESCRIPTION OF THE DRAWINGS

A more detailed understanding can be had from the following description, given by way of example in conjunction with the accompanying drawings wherein.

DETAILED DESCRIPTION

A method for operating a memory having a plurality of banks accessible in parallel, each bank including a plurality of grains accessible in parallel is provided. The method includes: based on a memory access request that specifies a memory address, identifying a set that stores data for the memory access request, wherein the set is spread across multiple grains of the plurality of grains; and performing operations to satisfy the memory access request, using entries of the set stored across the multiple grains of the plurality of grains.

Figure 1:
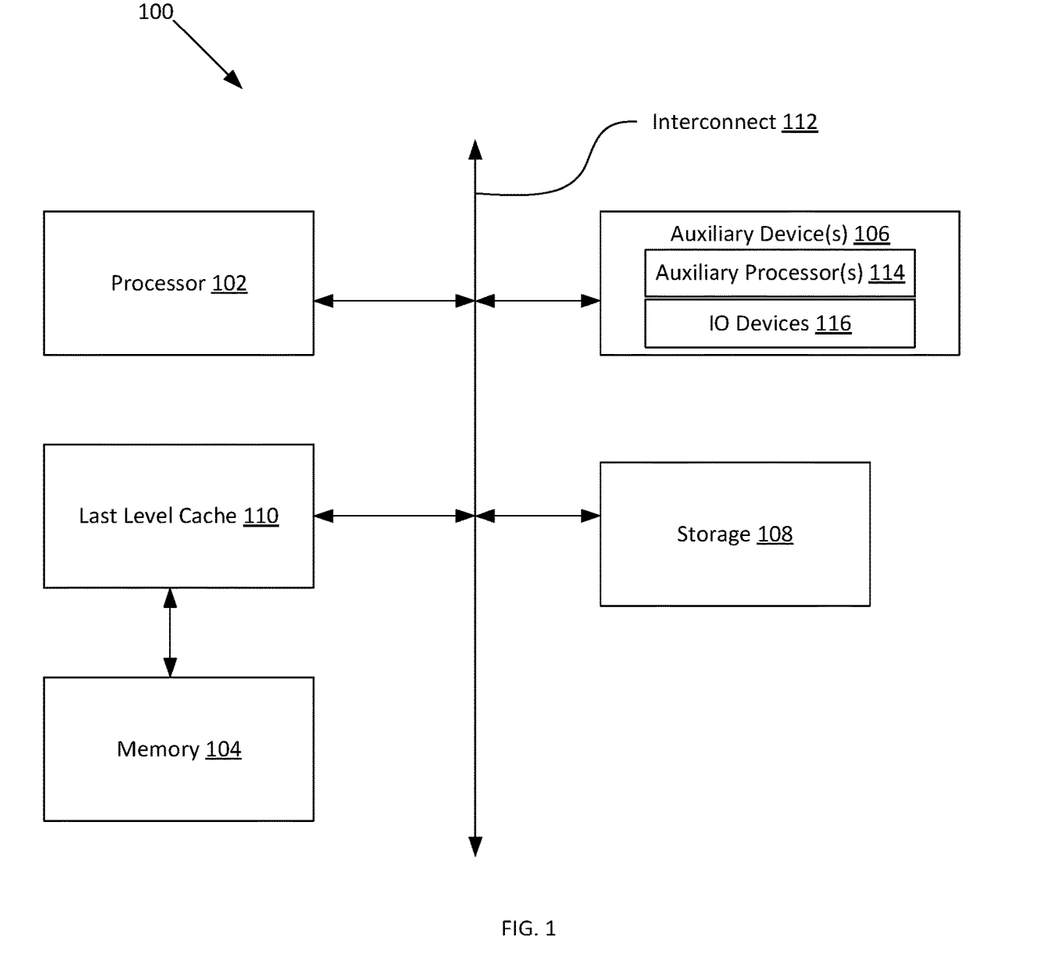
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102 and the various auxiliary devices 106. In some implementations, there other caches within the device 100. In some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches.

In some examples, the last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104. Although techniques are described herein for operations involving the last level cache 110, it should be understood that the techniques can alternatively be used in other types of caches or memories.

Figure 2:
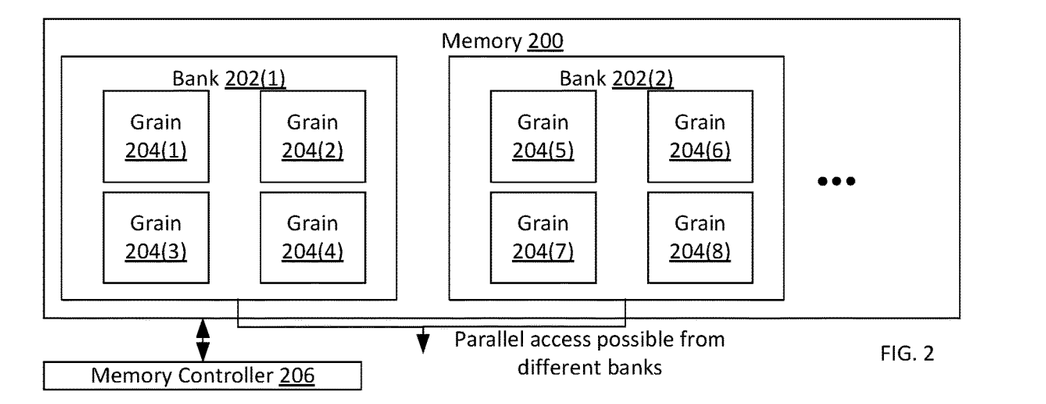
FIG. 2 is a block diagram of a memory, according to an example.

FIG. 2 is a block diagram of a memory 200, according to an example. In some examples, the last level cache 110 is implemented as the memory 200. However, the present disclosure contemplates the illustrated memory 200 being used for purposes other than as a last level cache 110.

The memory 200 includes a memory controller 206 and a plurality of banks 202. In various examples, the memory controller 206 is external to or integrated with the memory 200, and in various examples, the memory controller 206 is considered part of the memory 200 or is considered part of an entity that is separate from the memory 200. Each bank 202 of the memory 200 includes a plurality of grains 204. The grains 204 include a number of memory elements, each of which stores an amount of data (such as a bit). Banks 202 are subdivisions of the memory 200, and grains 204 are subdivisions of a bank 202.

The memory controller 206 receives commands for access to the data stored within the memory 200 and accesses the data as requested. Example access types include storing data into the memory 200 (for example, a "store") and reading data from the memory 200 (for example, a "load").

It is possible for the memory controller 206 to access data stored in different banks in parallel. Moreover, each bank has a certain amount of input bandwidth and output bandwidth, which limits the amount of data that can be written into a bank 202 or read from a bank 202 in a given amount of time. The memory controller 206 is capable of accessing the memory 200 with a greater amount of bandwidth than the bandwidth available to a single bank 202 by accessing data in multiple banks 202 in parallel. For example, where the memory controller 206 could perform access for one unit of bandwidth in a given amount of time for one bank 202, the memory controller 206 is capable of performing an access for N units of bandwidth in the same amount of time for N banks 202.

Grains 204 have similar bandwidth characteristics as banks 202 in that it is possible for the memory controller 206 to perform accesses for a particular bank 202 with greater bandwidth by accessing data in multiple different grains 204 of the bank 202 concurrently. In an example, while one grain 204 has a single unit of bandwidth for a given amount of time, four grains 204 of the same bank 202 have four units of bandwidth (four times the bandwidth) for the given amount of time. Based on the above, the memory controller 206 is able to perform accesses with more bandwidth by accessing multiple grains 204 of multiple banks 202 concurrently than by performing accesses with fewer grains 204 and/or fewer banks 202 concurrently.

In some examples, the phrase "accessing multiple elements concurrently" or a similar phrase means that in a particular unit of time, each of the multiple elements is accessed. In some examples, accessing multiple elements concurrently means performing accesses to the multiple elements at the same time. In some examples, accessing multiple elements concurrently means that data transmission lines to each element exist and that each data transmission line is capable of performing an access with one unit of bandwidth. When used together, the multiple data transmission lines provide a multiple of the unit of bandwidth, where the multiple is equal to the number of data transmission lines. In other words, each element accessed concurrently has a dedicated data transmission line, and the bandwidth for the multiple data transmission lines for different elements is summed together. In some examples, the memory 200 has a fine-grained dynamic random access memory ("FG-DRAM") architecture or a very-fine-grained dynamic random access memory ("VFG-DRAM") architecture.

Figure 3:
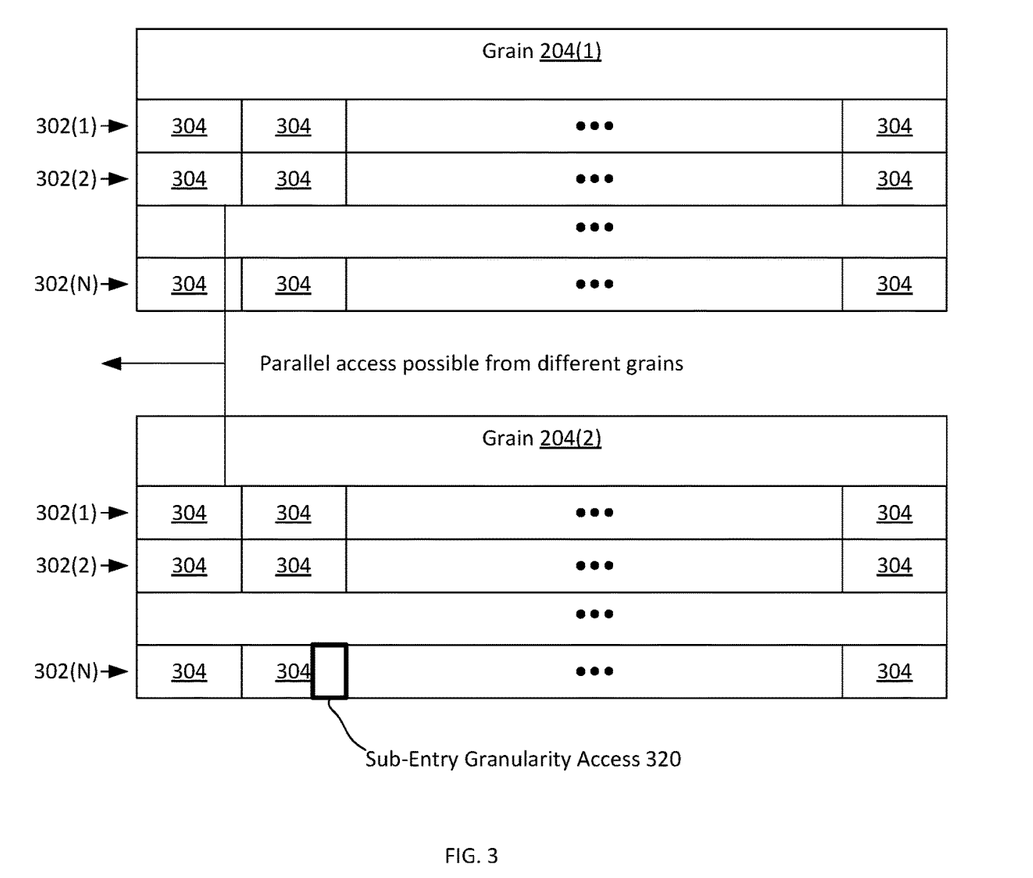
FIG. 3 is a block diagram illustrating the grains of the memory, according to an example.

FIG. 3 is a block diagram illustrating the grains 204 of the memory 200, according to an example. It is possible to use the memory 200 as a cache, in which cache entries (e.g., cache lines) are stored within the grains 204 of the memory 200. In such examples, each grain 204 includes N rows 302. Each row 302 includes a plurality of cache entries 304. In some examples, the cache entries 304 are cache lines. In some examples, each cache line has the same size, such as 64 bytes.

As stated above, the memory controller 206 is capable of accessing data in the different grains 204 in parallel. Moreover, accessing data in parallel in this manner means that accessing more grains 204 in parallel can be done with greater bandwidth and lower latency than accessing fewer grains 204 in parallel. For example, reading a cache entry 304 in row 302(1) of grain 204(1) in parallel with reading a cache entry 304 in row 302(1) of grain 204(2) can be done with greater bandwidth than reading data from a single grain 204. Put differently, the memory controller 206 is able to fully utilize the available bandwidth by accessing more grains 204. An additional aspect is that if two cache entries 304 worth of data is stored in a single grain 204, then that data is accessed more slowly than if those two cache entries 304 worth of data were stored in two grains 204. For example, storing one cache line worth of data in an entry 304 of row 302(2) of grain 204(1) and another cache line worth of data in an entry 304 of row 302(2) of grain 204(2) allows that data to be accessed in parallel. By contrast, storing two cache entries 304 worth of data in a single grain 204 could not be accessed in parallel and must be serialized (accessed back to back).

In addition to the above, in some examples, the memory 200 has sub-cache-line access granularity. In other words, it is possible for the memory controller 206 to access (e.g., read or write) a portion of a cache entry 304 at a time. This access is shown by way of example as a sub-entry access granularity 320. For example, in the situation that cache entry 304 are 64 bytes, it is possible to read only eight bytes of a cache entry in a given clock cycle. Thus, the amount of bandwidth that is wasted can be reduced by only reading a portion of the cache line. For example, instead of taking eight cycles to read all 64 bytes of a cache line, it is possible to take only one cycle to read all 64 bytes of the cache line.

Figure 4:
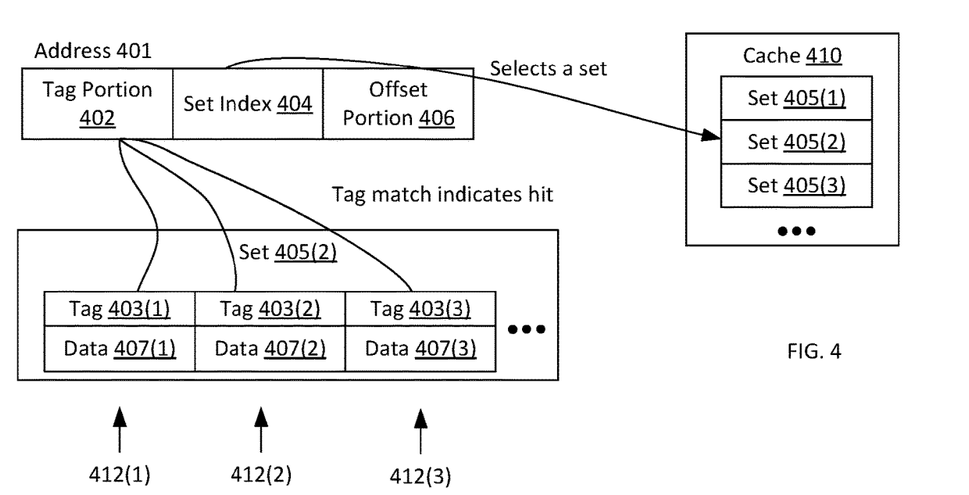
FIG. 4 illustrates some aspects of cache operations, according to an example.

As described above, it is possible to use the memory 200 as the last level cache 110 of FIG. 1, or as another cache serving a different purpose and/or being at a different location. FIG. 4 illustrates some aspects of cache operations, according to an example. A cache 410 is illustrated including a number of sets 405. The sets 405 each include a number of entries 412. Each entry 412 includes a tag 403 and data 407.

A cache 410 that includes multiple sets 405, each of which includes multiple entries 412 is a set-associative cache. With a set associative cache, each memory address can map to multiple cache entries 412, but maps to a limited number of sets 405 (e.g., to one set 405). This scheme is in contrast with a direct mapped cache in which each memory address maps to only one cache entry and is also in contrast with a fully-associative cache in which each memory address can map to any entry in the cache. In the context of set-associativity, an address mapping to one or more entries in the cache means that accesses (e.g., reads or writes) made for that address can possibly refer to any of the one or more entries, but cannot refer to any other entry. Put differently, when a cache miss occurs for a data access at an address, the cache allocates an entry for that data. The cache selects an entry from the set or sets associated with the address, but not for sets not associated with the address.

An example address 401 is illustrated. The address 401 includes a tag portion 402, a set index 404, and an offset portion 406. When an access (e.g., a read or a write) occurs using the address 401, a cache controller attempts to determine whether the data referenced by the access is in the cache (a hit) or is not in the cache (a miss). To determine whether the data is in the cache, the cache 410 identifies a set 405 associated with the address 401. A set index 404 of the address 401 uniquely identifies a set 405. The cache 410 examines the tags 403 of the entries 412 within that set 405. If any of the tags 403 matches the tag portion 402 of the address, then a hit occurs, and the data 407 corresponding to the tag portion 402 and set index 404 is identified as the requested data. If no such tag 403 matches the tag portion 402, then a miss occurs. In the event of a miss, the cache 410 fetches the data from a higher portion of the cache hierarchy (e.g., a higher level cache or system memory), identifies an entry 412 in which to place that data (e.g., using an eviction policy such as least recently used), and places the fetched data into the identified entry 412. The cache also provides the fetched data to the requester in the event of a read and/or modifies the data in the event of a write. In the event of a hit, the cache 410 performs the requested access (read or write) on the data in the entry 412 for which the hit occurred.

Although tags 403 are shown as "part" of an entry 412 in FIG. 4, such entries should be interpreted as a conceptual depiction of entries 412 and should not be interpreted as requiring that tags 403 and data 407 must be stored together. In fact, in the memory 200 illustrated in FIGS. 2 and 3, advantage can be gained by segregating the tags from the corresponding data. This segregation allows for the data entries to be the same size as the entries 304 of the memory 200. For example, some entries 304 can be designated as storing tags and not data and other entries 304 can be designated as storing data and not tags.

Figure 5A:
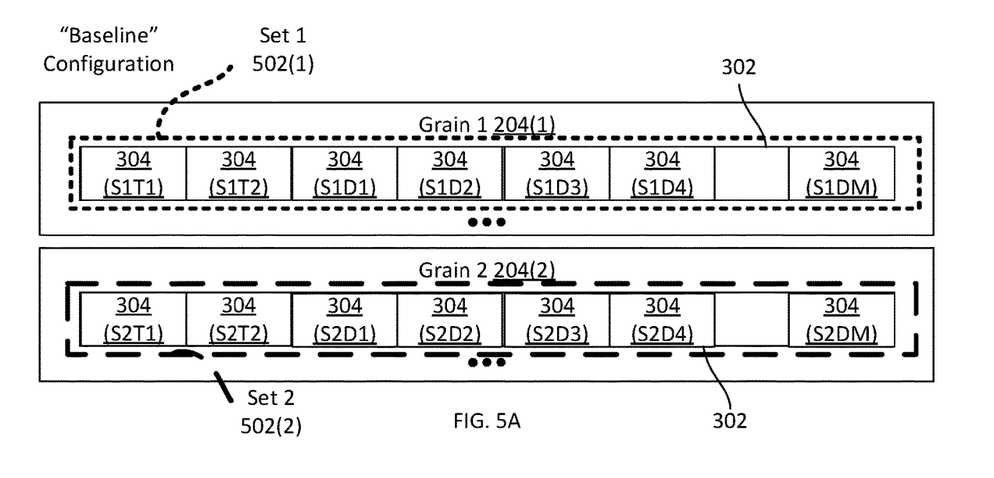
FIG. 5A illustrates one configuration for the memory, in which tags are segregated from data, according to example.

FIG. 5A illustrates one configuration for the memory 200, in which tags are segregated from data, according to example. This configuration is referred to herein as a "baseline configuration." In the baseline configuration, each row 302 of each grain 204 stores all tags and data for a set. Moreover, a set is contained entirely within a row 302 of a grain 204, meaning that all tags and data for a set is stored in one row 302 of one grain 204 and is not stored in any other row 302 of any other grain. It should be understood that although only one row 302 is shown in each grain 204, grains are able to store multiple rows 302, and it is possible for each such row 302 to be configured as described with respect to FIG. 5A.

In addition to the above, a row 302 stores tag entries 304 and data entries 304. In FIG. 5A, the tag entries are designated as 304(SXTY), where X is the set number and Y is the tag entry number. Each data entry is designated as 304(SXDY), where X is the set number and Y is the data entry number. Each tag entry 304 has a plurality of tags and each data entry 304 stores data. Each tag entry 304 has tags for a plurality of data entries 304.

In the configuration of FIG. 5A, fetching tags and data occurs with a bandwidth penalty. More specifically, because the tags and data for a set are in the same grain 204, accessing the tags and data for the set cannot occur with as much bandwidth as compared with the situation in which the tags and data were in different grains 204, since different grains can be accessed in parallel. This fact means that cache lookups in the memory configured as in FIG. 5A incur some latency, since tags are first looked up, checked for a match, and then the data entry associated with that match is accessed. In other words, tag access and data access is serialized—first, tags are accessed, and then data is accessed.

Figure 5B:
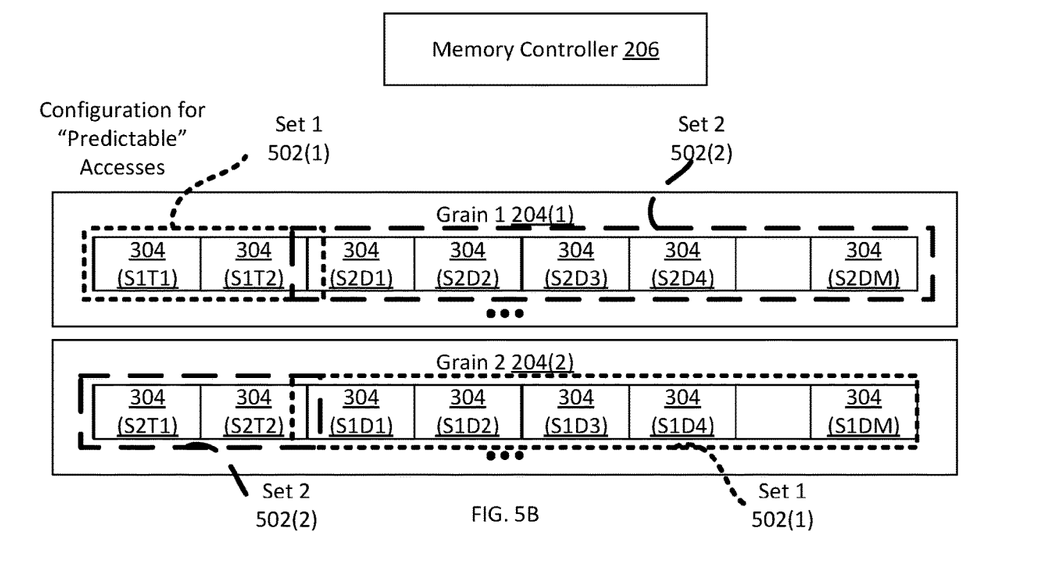
FIG. 5B provides a configuration in which tags and data for a single set are stored in different grains, according to an example.

For the above reason, FIG. 5B provides a configuration in which tags and data for a single set are stored in different grains 204, according to an example. The memory controller 206 stores tags for a set 502 in one grain 204 and stores data for the same set 502 in a different grain 204. This storing can occur as misses occur and the memory controller 206 populates the memory 200 with cache entries (tags and data). Storing tags and data in different grains 204 allows access to tags and data in parallel, meaning that the bandwidth with which tags and data can be looked up is increased as compared with the configuration of FIG. 5A. To take advantage of this additional bandwidth, the memory controller 206 employs prediction that predicts which tags and which data are likely to be needed based on characteristics of the memory access. Any technically feasible prediction technique can be used. The prediction technique accepts the memory access (which specifies at least an address and an operation such as load or store) and, optionally, access metadata, and predicts which entry 304 is most likely to contain the data for the access and which tag entry 304 is most likely to contain the tags for the access (i.e., the tag associated with the tag portion 402 of the address specified by the access). In various examples, the prediction technique accepts one or more of the following items of metadata: the address of the access, the address of the instruction that made the address, the identity of the thread that made the access request, the identity of the device (e.g., CPU, APD, input/output device, or other device) that made the access, and/or other identifying information. In some examples, the prediction technique alternatively or additional maintains one or more histories such as a global history hash, a set of specific (e.g., specific to access address, instruction address, set, or other item) histories, and/or other types of history.

Based on the above information, the prediction technique predicts which tags stored in the memory are likely to contain the tag for the memory access and which entry 304 is likely to store the data. Because the tags and data for a single set are stored in different grains 204, the memory controller 206 is able to, and does, access both the tags and data for the memory access in parallel. The bandwidth for accessing tags and data is thus increased as compared with the scheme of FIG. 5A. If the tags indicate that there is a hit and that the predicted and fetched data is the data for the memory access, then the memory controller 206 performs the correct access on the data. If the correct tag was not fetched (specifically, the fetched tag did not contain the tag for the access), then the memory controller 206 performs subsequent actions to fetch the correct tag and to fetch the correct data. If the correct tag was fetched and indicates a hit, but the data was not in the fetched data entry 304, then the memory controller 206 fetches the correct data entry for access. If the correct tag was not fetched, then the memory controller 206 performs further actions to fetch the correct tag to determine whether a hit or miss occurs. In an example, the memory controller 206 fetches other tags, testing such tags against the address of the access to determine whether a match occurs. If a match does not occur for any tag in the set 502, then a miss occurs and the memory controller 206 services the miss by fetching the data from higher up in the hierarchy and creating a new entry within the set 502. If a match occurs for a tag in the set 502, then the memory controller 206 services the memory access request using the corresponding data stored in the set 502.

The scheme of FIG. 5B is beneficial for the situation in which the prediction performed by the memory controller 206 is considered to be reasonably accurate. High accuracy may occur for certain workload types, deemed "predictable workloads." In the situation that prediction is not considered to be accurate, for workloads deemed to be "unpredictable workloads," the memory controller 206 utilizes the scheme of FIG. 5C.

Figure 5C:
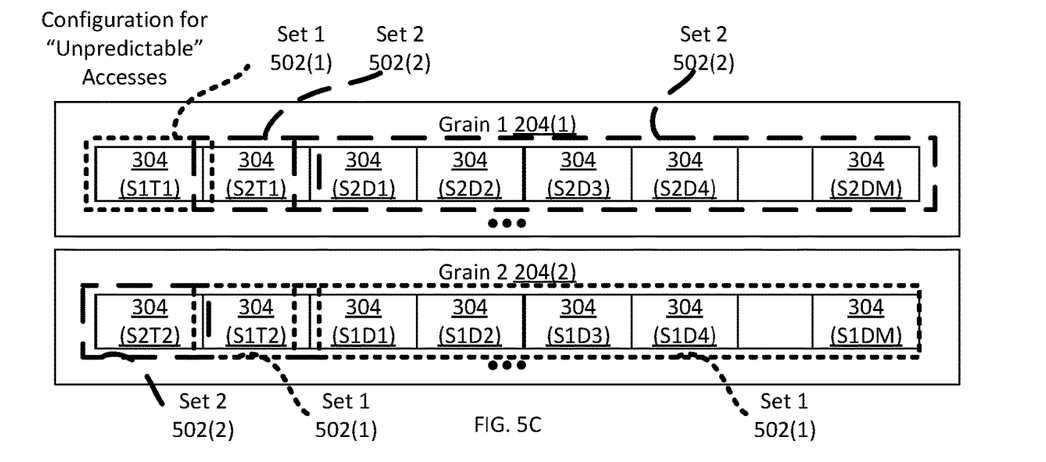
FIG. 5C provides a configuration in which tags are stored in different grains, according to an example.

In FIG. 5C, the tags for a single set 502 are spread throughout multiple grains 204. This spreading allows the memory controller 206 to fetch multiple entries 304 worth of tags (such as all tags for a set 502) in parallel. Fetching more tags in parallel allows the memory controller 206 perform a greater number of checks of the tag portion 402 of the access address 401 against the tags of a set 502 in parallel, which reduces the total access latency for the memory access. For example, consuming fewer cycles to check tags allows the memory controller 206 to access the data entry 304 earlier than if more cycles were consumed. In the event that the tags indicate a hit, the memory controller 206 accesses the associated data entry 304. In the event that the tags indicate a miss, the memory controller 206 fetches the data from a higher level of the hierarchy, places that data into the cache, and services the request from that fetched data. Hence both hits and misses are identified at low latency.

Figure 6A:
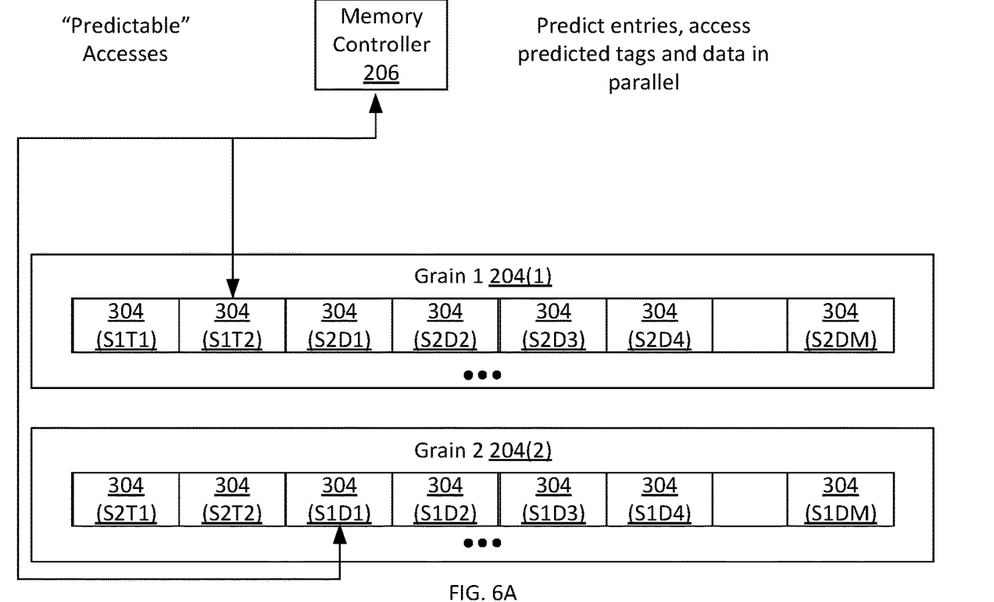
FIG. 6A illustrates operations for the predictable configuration, according to an example.
Figure 6B:
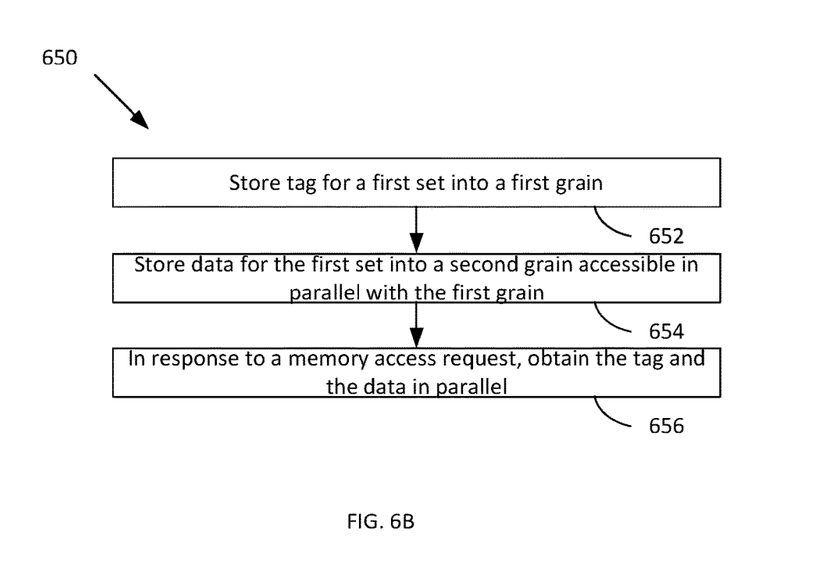
FIG. 6B is a flow diagram of a method for operating a memory according to the predictable configuration, according to an example.

FIG. 6A illustrates operations for the predictable configuration, according to an example. FIG. 6B is a flow diagram of a method 650 for operating a memory according to the predictable configuration, according to an example. Although described with respect to the system of FIGS. 1-5C, those of skill in the art will recognize that any system configured to perform the steps of the method 650 in any technically feasible order falls within the scope of the present disclosure. FIGS. 6A and 6B will now be described together.

At step 652, the memory controller 206 stores a tag for a first set into a first grain. The tag is a tag for at least one item of data of a cache entry, as described elsewhere herein. At step 654, the memory controller 206 stores data for the first set into a second grain that is accessible in parallel with the first grain. The data stored into the second grain is data that corresponds to the tag stored in the first grain. As described elsewhere herein, the tag allows the memory controller 206 to find the item of data within a set that corresponds to a memory address. At step 656, in response to a memory access request, the memory controller 206 obtains the tag and the data in parallel. In the example of FIG. 6A, the memory controller 206 fetches tags (304(S1T2)) from grain 1 204(1) in parallel with accessing data (304(S1D1) from grain 2 204(2).

In some examples, the memory controller 206 uses prediction to identify which tag and which data item to fetch in parallel in steps 652 and 654. The memory controller 206 performs other operations as described elsewhere herein, such as verifying that the fetched tag corresponds to the fetched data, and checking whether the fetched tag indicates a hit. The memory controller 206 performs other operations as described elsewhere herein in the event that the tag is not associated with the data, the data is not the requested data, or the tags indicate a miss.

In some examples, the memory 200 has access granularity of less than a cache entry 304. This means that the memory 200 is able to provide access to a portion of each cache entry of multiple cache entries 304 of the same grain in parallel. Thus, in some examples, the tags that are predicted by the memory controller 206 includes fewer tags than the amount of tags that can be stored in an entire cache entry 304. This operation frees up bandwidth for other operations, such as tag fetches for other memory access operations. In other words, it is possible to obtain the tags and data for one memory access in parallel with obtaining tags for a different memory access, if both sets of obtained tags include fewer tags than fit within a cache entry 304. The bandwidth made available by fetching fewer tags than can fit into a cache entry 304 can be used for any other purpose as well.

Figure 7A:
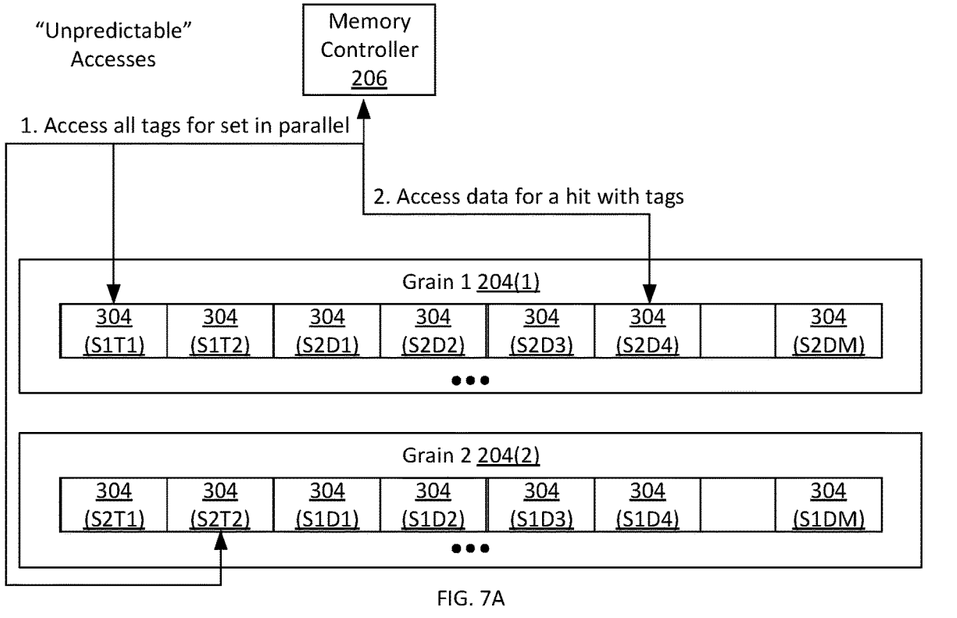
FIG. 7A illustrates operations for the unpredictable configuration, according to an example.
Figure 7B:
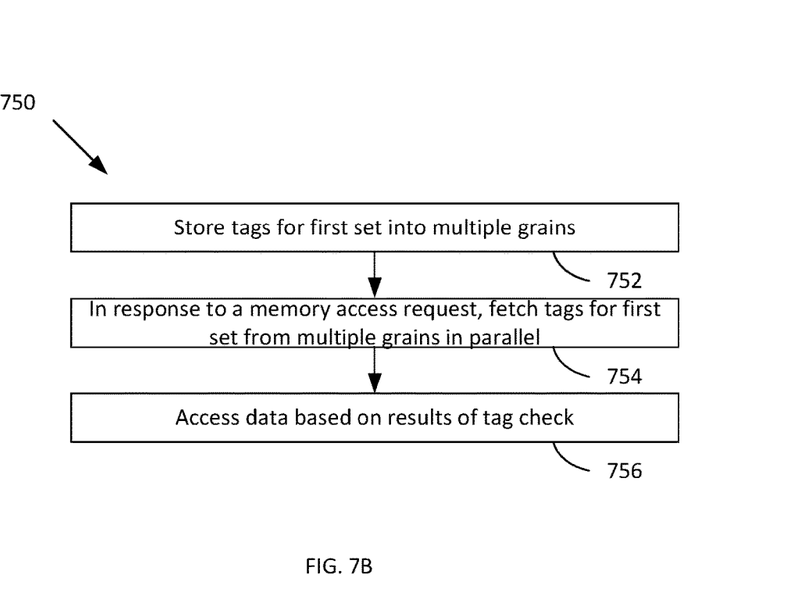
FIG. 7B is a flow diagram of a method for operating a memory according to the unpredictable configuration, according to an example.

FIG. 7A illustrates operations for the unpredictable configuration, according to an example. FIG. 7B is a flow diagram of a method 750 for operating a memory according to the unpredictable configuration, according to an example. Although described with respect to the system of FIGS. 1-5C, those of skill in the art will recognize that any system configured to perform the steps of the method 750 in any technically feasible order falls within the scope of the present disclosure. FIGS. 7A and 7B will now be described together.

At step 752, the memory controller 206 stores tags for a first set into multiple grains 204. In some examples, the memory controller 206 performs step 752 at multiple different times, in the course of bringing different entries into the memory 200. In an example, at a first time, a memory access for data that would be placed in a first set results in a miss. In response, the memory controller 206 fetches the data and places that data into the memory. The memory controller 206 also generates a tag for that data and places the tag into a first grain 204 that stores tags for the first set. At a second time, a memory access for second data that would also be placed in the first set results in a miss. In response, the memory controller 206 fetches the second data and places that data into the memory. The memory controller 206 also generates a tag for that data and places the tag into a second grain 204 that also stores tags for the first set. In summary, the memory controller 206 places data into the cache in response to different misses. Some such data that is to be placed in a first set has tags placed into a first grain 204 and other data that is to be placed in the first set has tags placed into a second grain 204.

At step 754, in response to a memory access request, the memory controller 206 fetches tags for a first set from multiple grain 204 in parallel. As described elsewhere herein, tags for a single set are stored in different grains 204. Thus, the amount of bandwidth available for accessing such tags is greater than if the tags for the set were stored in the same grain 204, because bandwidth is greater for accessing multiple grains 204 in parallel as compared with accessing a single grain 204 or fewer grain 204 in parallel.

At step 756, the memory controller 206 accesses data based on the results of a tag check. In some examples, step 756 is performed after and not in parallel with step 754. To perform the tag check, the memory controller 206 determines whether the tag portion 402 of the memory address associated with the access matches one of the tags that were fetched. If a match occurs, then the memory controller 206 determines that the corresponding data is stored in the memory 200. Thus, the memory controller 206 accesses that data as specified by the memory access request. In some examples, this access occurs not in parallel with the lookup, but subsequent to the lookup. If a match does not occur, then a miss occurs and the memory controller 206 fetches the data from a memory higher up in the hierarchy, such as system memory. The memory controller 206 places that fetched data into the memory 200, and places a tag for that data into one of the grains 204 that stores tags for the associated set.

In some examples, the memory controller 206 switches between the unpredictable mode and the predictable mode based on the workload being serviced. In an example, the memory controller 206 or another entity such as an operating system executing on the processor 102 determines which mode to use based on one or more of the following: the identity of an application that is executing or in focus, the identity of one or more hardware devices (e.g., GPU, video encoder or decoder, or other device) that is busy (e.g., has a workload above a threshold), performance parameters of the system 100, performance parameters of the cache 200 (e.g., hit rate or miss rate), or other parameters. In accordance with the above, in some examples, the memory controller 206 receives a memory access request and accesses the cache in accordance with the access request. The access is performed with memory that is configured according to either a predictable configuration or an unpredictable configuration, and in both these configurations, at least some tags of a set associated with the access are stored in a different grain than the data associated with the set. More specifically, the memory access request specifies an address that is associated with a set and the set has tags and data that are spread among multiple grains. In the predictable configuration, tags are located together in a grain and data is located in a different grain. In the unpredictable configuration, tags are located in different grains, and at least some tags are stored in a different grain than the data being requested.

The elements in the figures are embodied as, where appropriate, software executing on a processor, a fixed-function processor, a programmable processor, or a combination thereof. The processor 102, last level cache 110, interconnect 112, memory 104, storage 108, various auxiliary devices 106, clients 212, memory 200, and memory controller 206 include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a memory having a plurality of banks accessible in parallel, each bank including a plurality of grains accessible in parallel, the method comprising:
   identifying a set that stores data for a memory access request, wherein the set is spread across multiple grains of a plurality of grains, and tags of the set are spread across the multiple grains; and
   performing operations to satisfy the memory access request, using entries of the set stored across the multiple grains of the plurality of grains, the performing including accessing the tags stored in different grains in parallel to identify whether a hit occurs.

2. The method of claim 1, wherein a second set is configured in a configuration in which all tags of the second set are stored in a single grain.

3. The method of claim 2, further comprising performing operations to satisfy a second memory access request that targets the second set, the operations comprising:
   accessing first tags of the second set in parallel with first data of the second set, wherein the first tags are stored in a different grain than the first data.

4. The method of claim 3, further comprising predicting that the first tags and the first data store correct information for the memory access request.

5. The method of claim 4, further comprising:
   in response to either or both of the first tags or the first data not storing correct information for the memory access request, accessing second tags of the second set and second data of the second set.

6. The method of claim 1, further comprising:
   in response to a hit occurring, and not in parallel with accessing the tags, accessing data of the set to satisfy the memory access request.

7. The method of claim 1, further comprising:
   in response to a miss occurring, fetching data from a backing memory and storing the data into the set.

8. A system comprising:
   a memory having a plurality of banks accessible in parallel, each bank including a plurality of grains accessible in parallel; and
   a memory controller configured to:
      identify a set that stores data for a memory access request, wherein the set is spread across multiple grains of a plurality of grains, and tags of the set are spread across the multiple grains; and
      perform operations to satisfy the memory access request, using entries of the set stored across the multiple grains of the plurality of grains, the performing including accessing the tags stored in different grains in parallel to identify whether a hit occurs.

9. The system of claim 8, wherein a second set is configured in a configuration in which all tags of the second set are stored in a single grain.

10. The system of claim 9, wherein the memory controller is further configured to perform operations to satisfy a second memory access request that targets the second set, the operations comprising:

accessing first tags of the second set in parallel with first data of the second set, wherein the first tags are stored in a different grain than the first data.

11. The system of claim 10, wherein the memory controller is further configured to predict that the first tags and the first data store correct information for the memory access request.

12. The system of claim 11, wherein the memory controller is further configured to:

in response to either or both of the first tags or the first data not storing correct information for the memory access request, access second tags of the second set and second data of the second set.

13. The system of claim 8, wherein the memory controller is further configured to:

in response to a hit occurring, and not in parallel with accessing the tags, accessing data of the set to satisfy the memory access request.

14. The system of claim 8, wherein the memory controller is further configured to:

in response to a miss occurring, fetching data from a backing memory and storing the data into the set.

15. A computing device comprising:

a cache;
   a memory backing the cache; and
   a processor configured to store data in the memory and the cache,
   wherein the cache includes:
      a cache memory having a plurality of banks accessible in parallel, each bank including a plurality of grains accessible in parallel; and
      a memory controller configured to:
         identify a set that stores data for a memory access request, wherein the set is spread across multiple grains of a plurality of grains, and tags of the set are spread across the multiple grains; and
         perform operations to satisfy the memory access request, using entries of the set stored across the multiple grains of the plurality of grains, the performing including accessing the tags stored in different grains in parallel to identify whether a hit occurs.

16. The computing device of claim 15, wherein a second set is configured in a configuration in which all tags of the second set are stored in a single grain.

17. The computing device of claim 16, wherein the memory controller is further configured to perform operations to satisfy a second memory access request that targets the second set, the operations comprising:

accessing first tags of the second set in parallel with first data of the second set, wherein the first tags are stored in a different grain than the first data.

18. The computing device of claim 17, wherein the memory controller is further configured to predict that the first tags and the first data store correct information for the memory access request.

19. The computing device of claim 18, wherein the memory controller is further configured to:

in response to either or both of the first tags or the first data not storing correct information for the memory access request, access second tags of the second set and second data of the second set.

20. The computing device of claim 15, wherein the memory controller is further configured to:

in response to a hit occurring, and not in parallel with accessing the tags, accessing data of the set to satisfy the memory access request.

* * * * *